United States Patent Office 2,831,037
Patented Apr. 15, 1958

2,831,037

CONVERSION OF BICYCLO-OLEFINS

Louis Schmerling, Riverside, Ill., assignor to Universal Oil Products Company, Des Plaines, Ill., a corporation of Delaware No Drawing. Application June 1, 1954
Serial No. 433,807

12 Claims. (Cl. 260—666)

This invention relates to a method for converting bicyclo-olefins and more particularly to a method for polymerizing or isomerizing bicyclo-olefins to form bicyclo-olefinic substituted bicycloalkanes and tricycloalkanes, respectively.

It is an object of this invention to convert bicyclo-olefins to polymers thereof.

Another object of this invention is to isomerize bicyclo-olefins to tricycloalkanes.

One embodiment of this invention resides in the conversion of a bicyclo-olefin by heating said olefin in the presence of a catalyst comprising an inorganic oxide composited with a halogen compound, the halogen of said compound being selected from the group consisting of fluorine and chlorine.

A specific embodiment of the invention is found in a process for the polymerization of bicyclo [2.2.1]-2-heptene by heating said heptene in the presence of a catalyst comprising alumina, combined fluorine, a cobalt compound and molybdenum compound, and recovering the resultant bicyclo [2.2.1]-2-hepten-2-yl-bicyclo [2.2.1]-heptane.

Another specific embodiment of the invention is found in a process for isomerizing bicyclo [2.2.1]-2-heptene which comprises heating said heptene in the presence of a catalyst comprising alumina, combined fluorine, a cobalt compound, and a molybdenum compound, and recovering the resultant tricyclo [2.2.1.0$^{2,6}$] heptane.

A more specific embodiment of this invention resides in a process for obtaining a new composition of matter comprising bicyclo [2.2.1]-2-hepten-2-yl-bicyclo-[2.2.1] heptane.

Other objects and embodiments of this invention referring to alternative bicyclo-olefins and to alternative catalysts will be referred to in the following further detailed description of this invention.

It has now been discovered that bicyclo-olefins may undergo a conversion reaction to form polymers, and more particularly, dimers of the starting bicyclo-olefin, or may also undergo an isomerization to form tricyclic alkanes. The compounds thus prepared are suitable as intermediates in the preparation of perfumes, pharmaceuticals, insecticides, plastics, resins and other organic compounds.

The preferred type of bicyclo-olefins which undergo conversion in the process of the present invention is the product obtained by the reaction of cyclo-pentadiene with a mono-olefin such as ethylene, propylene, butene-1, butene-2, pentene-1, pentene-2, 2-methylbutene-1, 2-methylbutene-2, 2-ethylbutene-2, 2-methylpentene-2, 2-ethylpentene-2, 2-methylpentene-3, 2-ethylpentene-3, etc., said products forming bicyclo [2.2.1]-2-heptene and its alkyl derivatives.

Examples of bicyclo-olefins which may undergo polymerization or isomerization according to the process of the present invention include bicyclo [2.2.1]-2-heptene, 1-methylbicyclo [2.2.1]-2-heptene, 5-methylbicyclo [2.2.1]-2-heptene, 1,5-dimethylbicyclo[2.2.1]-2-heptene, santene (2,3-dimethylbicyclo [2.2.1]-2-heptene), 1,4-dimethylbicyclo[2.2.1]-2-heptene, 7,7-dimethylbicyclo [2.2.1]-2-heptene, terpenes such as thujene (bicyclo [3.1.0]-2-hexene), 1-methylbicyclo [3.1.0]-2-hexene, 1,4-dimethylbicyclo [3.1.0]-2-hexene, 1-ethylbicyclo [3.1.0]-2-hexene, 2,3-dimethylbicyclo [3.1.0]-2-hexene, 1,5-dimethylbicyclo [3.1.0]-2-hexene, 1-methyl-4-propylbicyclo [3.1.0]-2-hexene, 1-propyl-2,3-dimethylbicyclo [3.1.0]-2-hexene, pinene (1,7,7-trimethylbicyclo [3.1.1]-2-heptene), 1,4-dimethylbicyclo [3.1.1]-2-heptene, 2,3-dimethylbicyclo [3.1.1]-2-heptene, 1,4,7,7-tetramethylbicyclo [3.1.1]-2-heptene, 1-methyl-4-propylbicyclo [3.1.1]-2-heptene, 1,4-diethyl-7,7-dimethylbicyclo [3.1.1]-2-heptene, 1-propyl-5,7,7-trimethylbicyclo [3.1.1]-2-heptene, etc.

The catalyst which is used to polymerize and/or isomerize the bicyclo-olefins of the present invention comprises an acidic inorganic oxide support composited with a halogen compound, the halogen being selected from either chlorine or fluorine. The inorganic oxide support includes alumina, silica, zirconia, thoria, etc., or mixtures thereof such as alumina-silica, alumina-zirconia, silica-zirconia, alumina-zirconia-silica, etc. The preferred halogen compounds which are composited with the inorganic oxide support comprise hydrogen fluoride or boron fluoride, although other halogen compounds such as hydrogen chloride, boron chloride, etc. may also be used. In addition, metal compounds selected from group VI and VIII of the periodic table may also be composited with the inorganic oxide support and the halogen compound, the preferred metals being cobalt and molybdenum, although chromium, tungsten, iron, nickel, etc. may also be used. The preferred catalyst of this invention comprises alumina, combined halogen, a cobalt compound and a molybdenum compound. Other catalysts also include alumina impregnated with hydrogen fluoride and alumina impregnated with boron fluoride. The amount of halogen composited with the inorganic oxide support may vary from about 3% to 15%, the preferred range being from 5% to 10%.

The operating conditions of temperature and pressure at which the process of the present invention is run will depend upon the particular bicyclo-olefin undergoing conversion. Generally, temperatures in the range of from about 50° to about 250° C. or more are used, the preferred range being from about 80° to about 225° C. In addition, the pressure is sufficient to maintain the bicyclo-olefin in a liquid phase. The residence time during which the bicyclo-olefin undergoes conversion is itself dependent upon the temperatures and pressures used, the time generally ranging from 2 to about 15 hours or more.

The process of the present invention may be effected in any manner and may comprise either a batch or continuous type operation. When a batch type operation is used, a quantity of the starting material, namely, a bicyclo-olefin and the desired catalyst are placed in an appropriate apparatus containing reflux means. The vessel is heated to the desired temperature and the contents thereof refluxed for the desired residence time. The reaction is exothermic in nature and the temperature may rise during the residence time of the reaction. At the end of this time, the vessel and the contents thereof are cooled to room temperature and the liquid product is separated and subjected to fractional distillation under reduced pressure.

Another method of operation comprises the continuous type operation in which the bicyclo-olefin is continuously charged to a reactor maintained at the desired operating conditions of temperature and pressure. The catalyst may also be continuously charged to the reactor through separate means or may be injected along with the bicyclo-olefin in the form of a slurry. The reactor may comprise an unlined vessel or coil, or may be lined with alumina, fire brick, dehydrated bauxite and the like. The polymerized and/or isomerized bicyclo-olefin is continuously withdrawn from the reactor after the desired residence time and subjected to fractional distillation under reduced pressure in a manner similar to that hereinbefore set forth, which process separates the polymerized bicyclo-olefin from the isomerized bicyclo-olefin and the unreacted starting material, said starting material being recycled as a portion of the feed stock.

Examples of converted bicyclo-olefins which comprise new compositions of matter include bicyclo[2.2.1]-2-hepten - 2 - yl - bicyclo[2.2.1] - heptane, 1-methylbicyclo[2.2.1]-2 - hepten - 2-yl-1-methylbicyclo[2.2.1]-heptane, 1,5-dimethylbicyclo[2.2.1]-2 - hepten - 2-yl-1,5-dimethyl-bicyclo[2.2.1] - heptane, bicyclo[3.1.0]-2 - hexen - 2-yl-bicyclo[3.1.0] - hexane, 1-ethylbicyclo[3.1.0] - hexen-2-yl-1-ethylbicyclo[3.1.0]-hexane, etc.

The following examples are given to illustrate the process of the present invention which, however, are not necessarily intended to limit the generally broad scope of said invention in strict accordance therewith.

*Example I*

21 g. of bicyclo[2.2.1]-2-heptene which had been prepared by reacting cyclopetadiene with ethylene was refluxed in the presence of 5 g. of a catalyst comprising alumina, combined halogen, a cobalt compound and a molybdenum compound.

The initial temperature of the reaction was 95° C., however, during the 12 hours in which the bicyclo-olefin was being refluxed the temperature rose to 209° C. At the end of this time, the vessel and the contents thereof were cooled to room temperature, the liquid product was separated and subjected to fractional distillation under reduced pressure. 2 g. of a liquid boiling at 102–104° C. consisting of the isomeric nortricyclene (tricyclo[2.2.1.0$^{2.6}$]-heptane) and 10 g. of the polymers of bicyclo[2.2.1]-heptene were recovered. About 4 g. of the polymer boiled at 103–104° C. at 4.3 mm. and had a refractive index, $n_D^{20}$, of 1.526; it consisted of the dimer (bicyclo[2.2.1]-2-hepten-2-yl-bicyclo[2.2.1]-heptane). The dimer was subjected to analysis with the following results.

Calculated for $C_{14}H_{20}$: C, 89.29; H, 10.71. Found C, 89.24; H, 10.78.

*Example II*

10 g. of bicyclo[2.2.1]-2-heptene was refluxed in the presence of 3 g. of catalyst comprising boron fluoride composited on alumina, the fluorine content of the catalyst being approximately 10%. The initial temperature of the reaction was 83° C. which rose to 96° C. during the 15 hours that the bicyclo-olefin was being refluxed. At the end of this time, the vessel and contents thereof were cooled to room temperature and the liquid product subjected to fractional distillation under reduced pressure. 5 g. of the polymer were recovered.

*Example III*

To show the advantage of having a combined halogen present in the catalyst, 21 g. of bicyclo[2.2.1]-2-heptene was refluxed in the presence of 5 g. of alumina for a period of 10 hours. The flask temperature during this time did not rise, remaining at approximately 95° C. Little reaction took place during this time and no polymer was separated upon fractional distillation.

I claim as my invention:

1. A process for the polymerization of a bicyclo-olefin which comprises heating said olefin at a temperature in the range of from about 50° C. to about 250° C. in the presence of a catalyst comprising alumina composited with a halogen compound, the halogen of said compound being selected from the group consisting of fluorine and chlorine, and recovering the polymerized hydrocarbon.

2. A process for the dimerization of a bicyclo-olefin which comprises heating said olefin at a temperature in the range of from about 50° C. to about 250° C. in the presence of a catalyst comprising an inorganic oxide support composited with a halogen compound, the halogen of said compound being selected from the group consisting of fluorine and chlorine, and recovering the dimerized hydrocarbon.

3. A process for the polymerization of a bicyclo olefin which comprises heating said olefin at a temperature in the range of from about 50° to about 250° C. in the presence of a catalyst comprising an acidic fluorine-containing inorganic oxide.

4. A process for the polymerization of a bycyclo-olefin which comprises heating said olefin at a temperature in the range of from about 50° to about 250° C. in the presence of a catalyst comprising a fluorine-containing alumina composited with a metal from group VI and a metal from group VIII of the periodic table.

5. A process for the polymerization of a bicyclo-olefin which comprises heating said olefin at a temperature in the range of from about 50° to about 250° C. in the presence of a catalyst comprising alumina, combined halogen, composited with a cobalt compound and a molybdenum compound.

6. A process for the polymerization of a bicyclo-olefin which comprises heating said olefin at a temperature in the range of from about 50° to about 250° C. in the presence of a catalyst comprising alumina treated with hydrogen fluoride.

7. A process for the polymerization of a bicyclo-olefin which comprises heating said olefin at a temperature in the range of from about 50° to about 250° C. in the presence of a catalyst comprising alumina treated with boron fluoride.

8. A process for the polymerization of bicyclo [2.2.1]-2-heptene which comprises heating said heptene at a temperature in the range of from about 50° to about 250° C. in the presence of a catalyst comprising an inorganic oxide support composited with a halogen compound, the halogen of said compound being selected from the group consisting of fluorine and chlorine.

9. A process for the polymerization of bicyclo[2.2.1]-2-heptene which comprises heating said heptene at a temperature in the range of from about 50° to about 250° C., in the presence of a catalyst comprising alumina, combined fluorine composited with a cobalt compound and a molybdenum compound, and recovering the resultant bicyclo[2.2.1]-2-hepten-2-yl-bicyclo[2.2.1]-heptane.

10. A process for the polymerization of bicyclo[2.2.1]-2-heptene which comprises heating said heptene at a temperature in the range of from about 90° to about 210° C., in the presence of a catalyst comprising alumina, combined fluorine composited with a cobalt compound and a molybdenum compound, and recovering the resultant bicyclo[2.2.1]-2-hepten-2-yl-bicyclo[2.2.1]-heptane.

11. Bicyclo-olefinic substituted bicycloalkane.

12. Bicyclo[2.2.1]-2-hepten - 2 - yl - bicyclo[2.2.1]-heptane.

References Cited in the file of this patent

UNITED STATES PATENTS

| | | |
|---|---|---|
| 2,286,129 | Veltman | June 6, 1942 |
| 2,349,232 | Joshel | May 16, 1944 |
| 2,480,267 | Schmerling | Aug. 30, 1949 |
| 2,480,268 | Schmerling | Aug. 30, 1949 |
| 2,657,245 | Davidson | Oct. 27, 1953 |
| 2,721,189 | Anderson et al. | Oct. 18, 1955 |
| 2,754,337 | Chirtel et al. | July 10, 1956 |
| 2,799,668 | Anderson et al. | July 16, 1957 |

FOREIGN PATENTS

| | | |
|---|---|---|
| 304,381 | Switzerland | Mar. 16, 1955 |